July 31, 1956   H. D. SCHARF   2,756,619
WIRE CUTTING AND STRIPPING MACHINES
Filed July 18, 1952   8 Sheets-Sheet 6

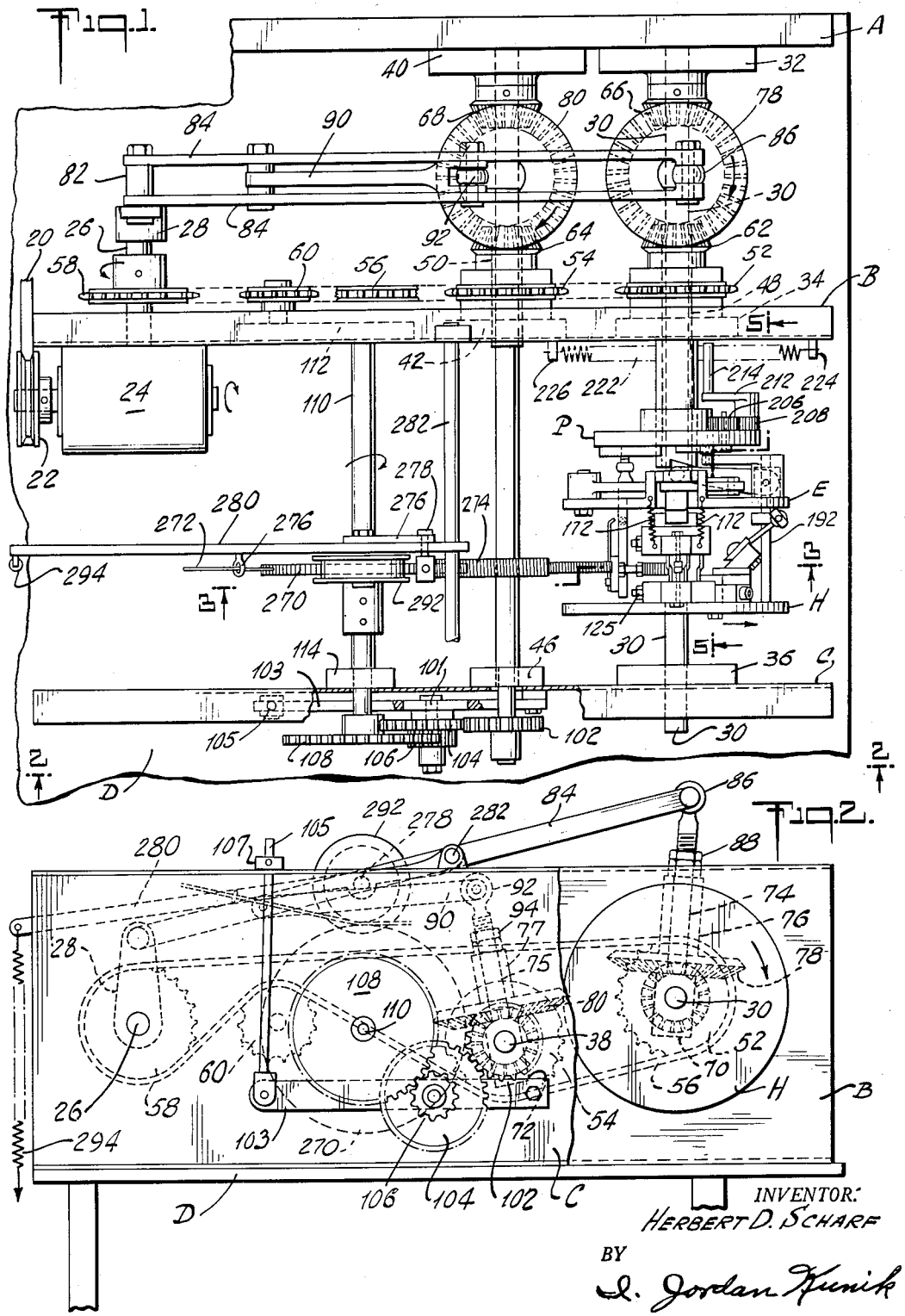

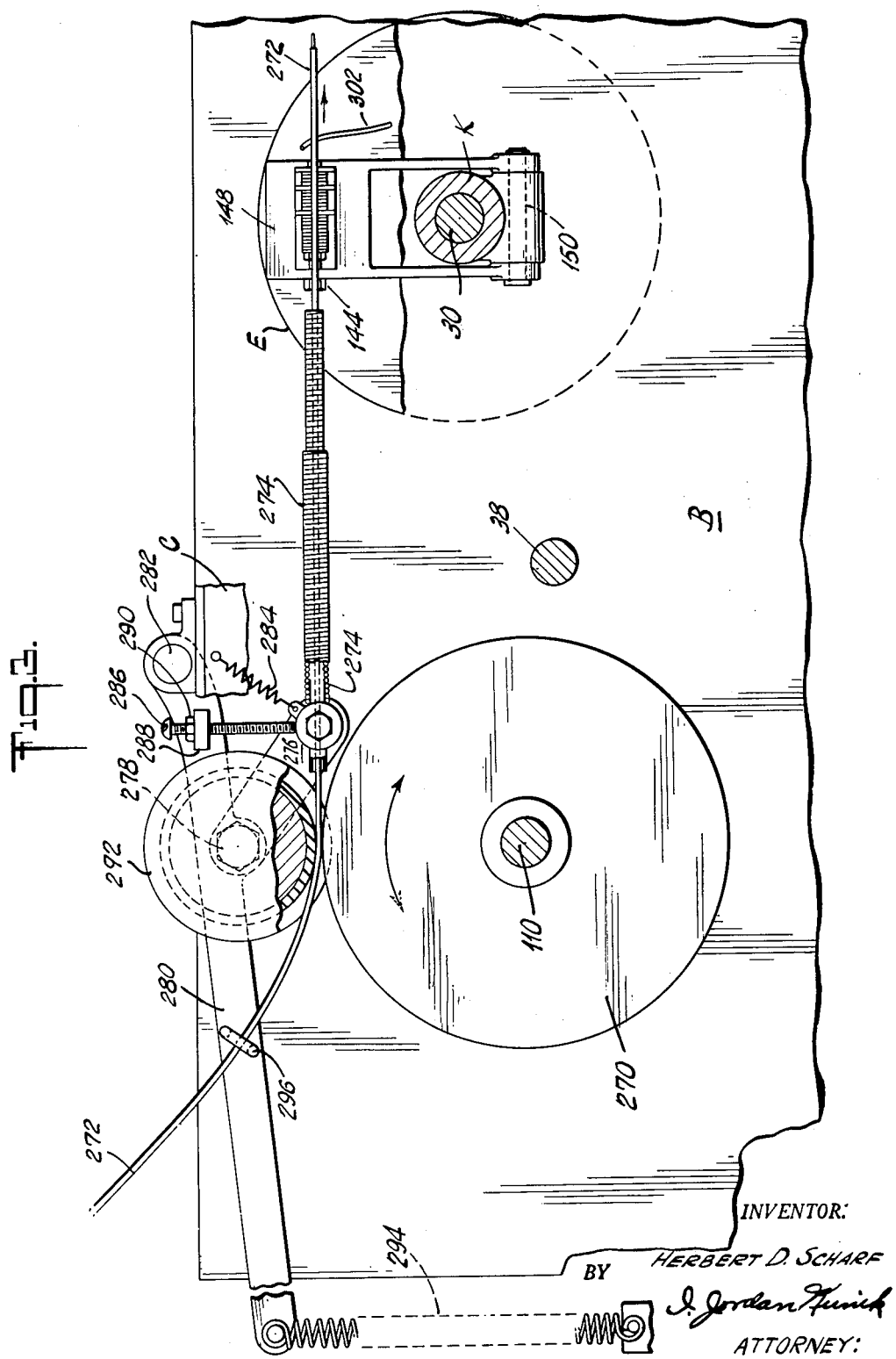

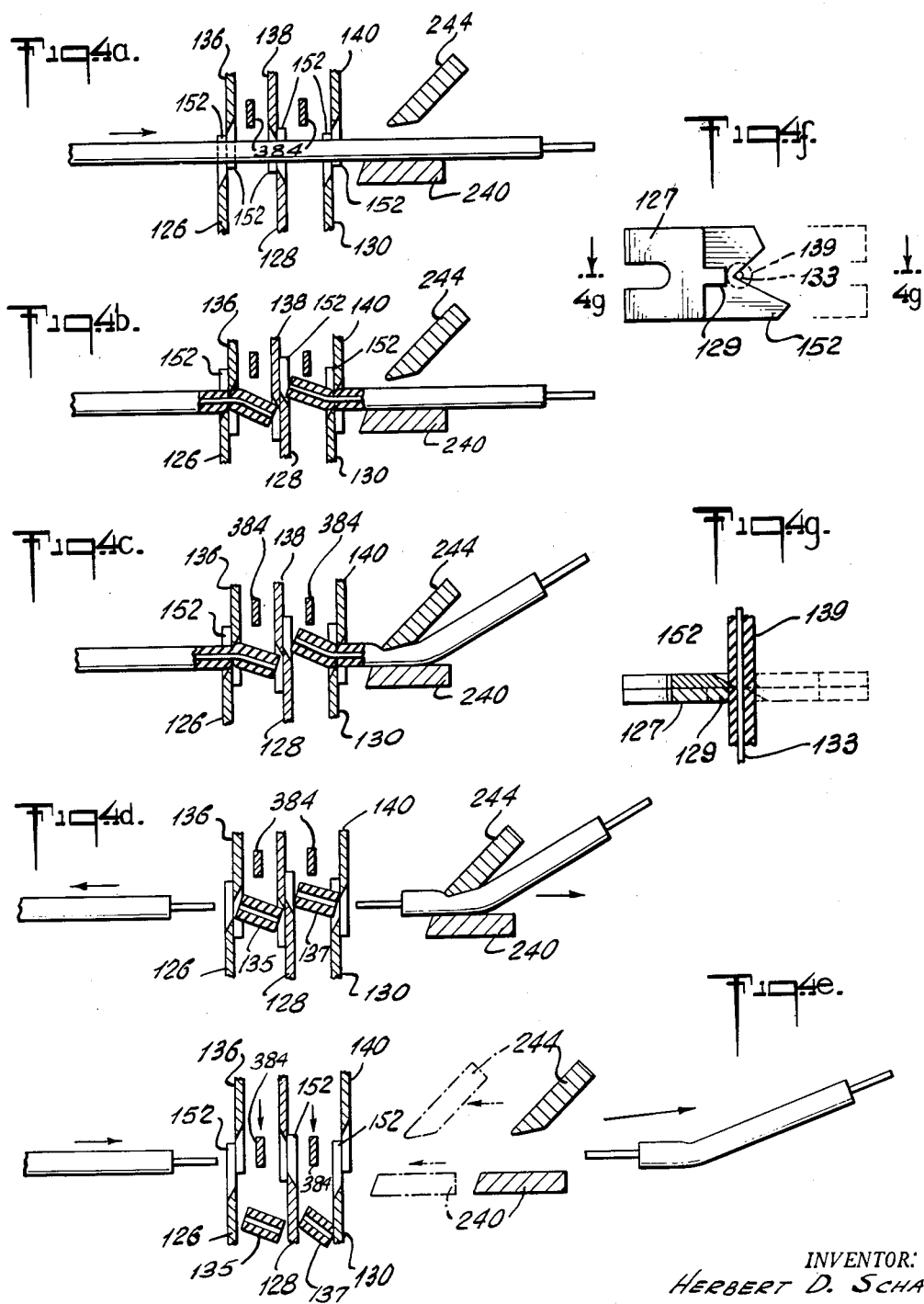

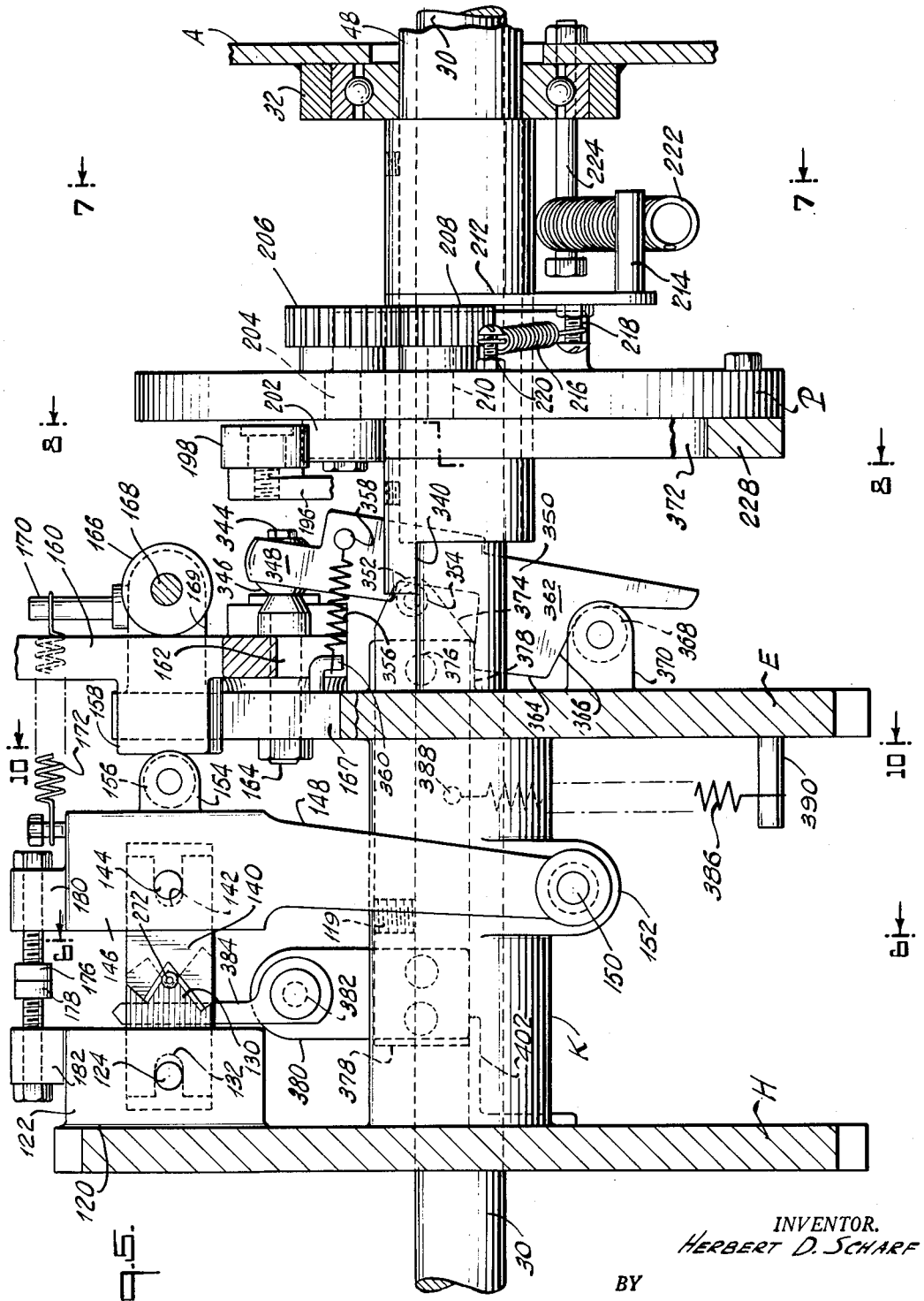

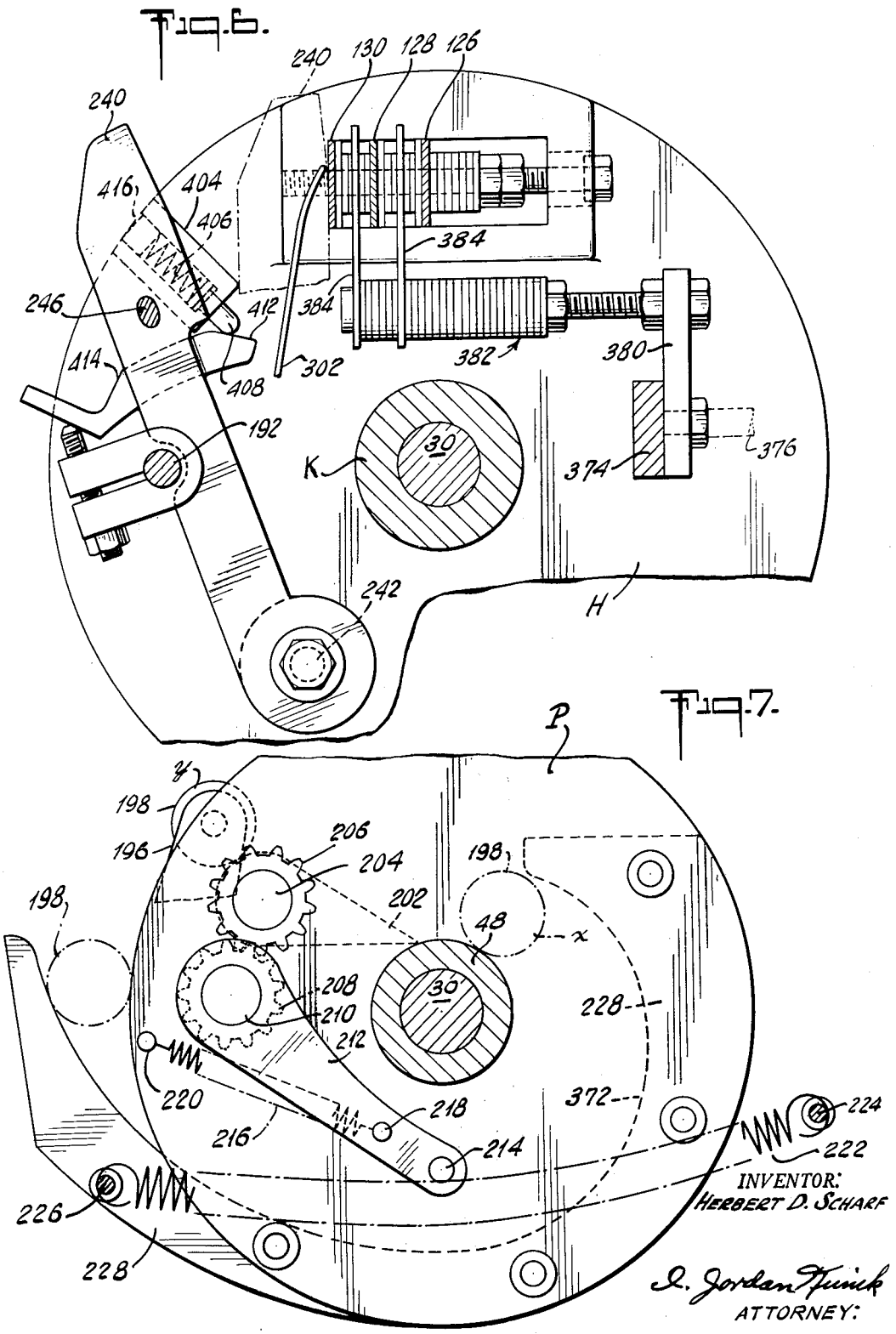

INVENTOR:
Herbert D. Scharf.
BY
ATTORNEY:

July 31, 1956 — H. D. SCHARF — 2,756,619
WIRE CUTTING AND STRIPPING MACHINES
Filed July 18, 1952 — 8 Sheets-Sheet 7
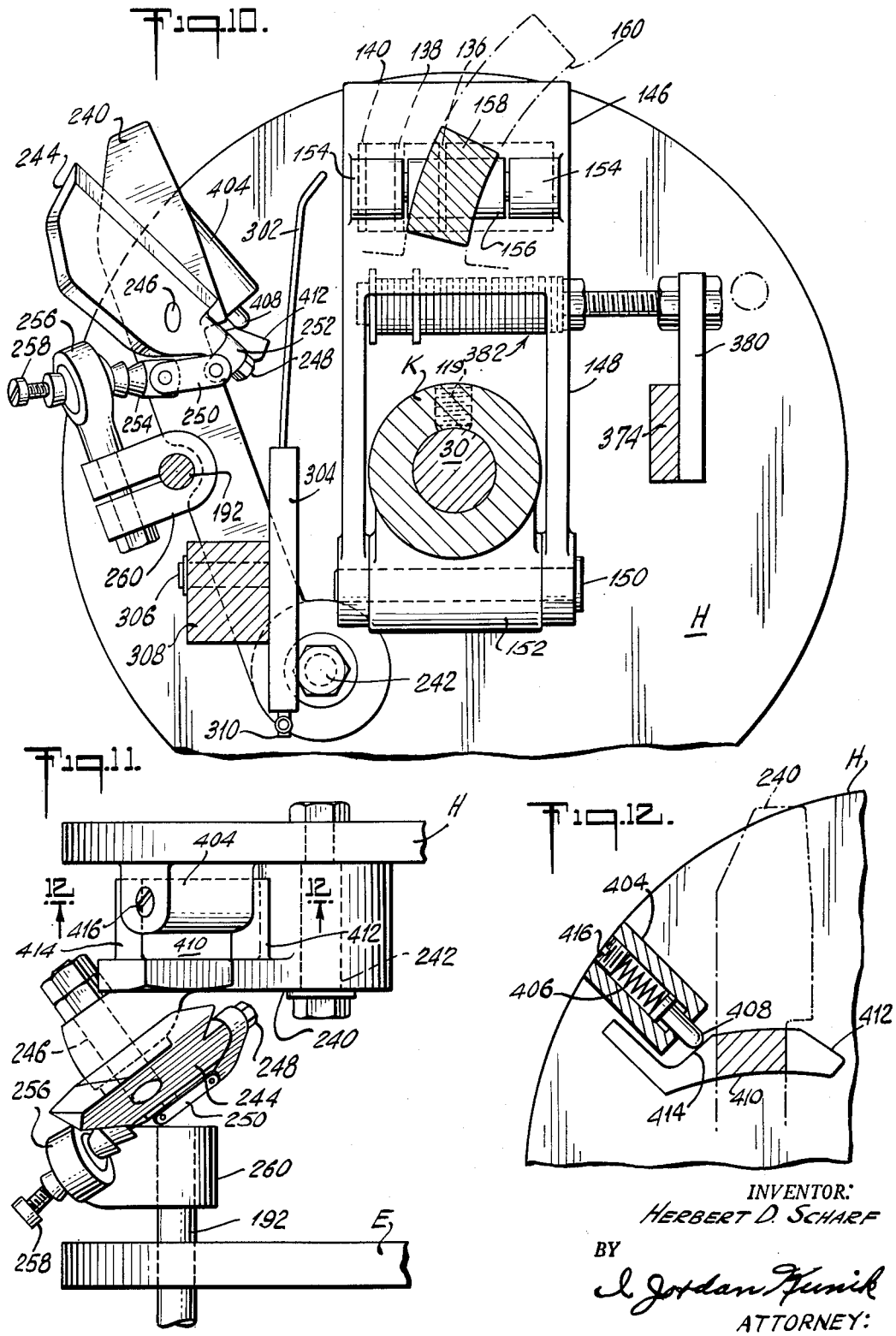
INVENTOR:
HERBERT D. SCHARF
BY
I. Jordan Kunik
ATTORNEY July 31, 1956    H. D. SCHARF    2,756,619
WIRE CUTTING AND STRIPPING MACHINES
Filed July 18, 1952    8 Sheets-Sheet 8
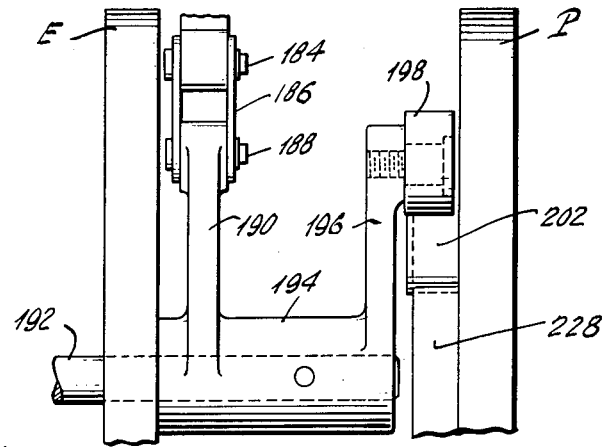
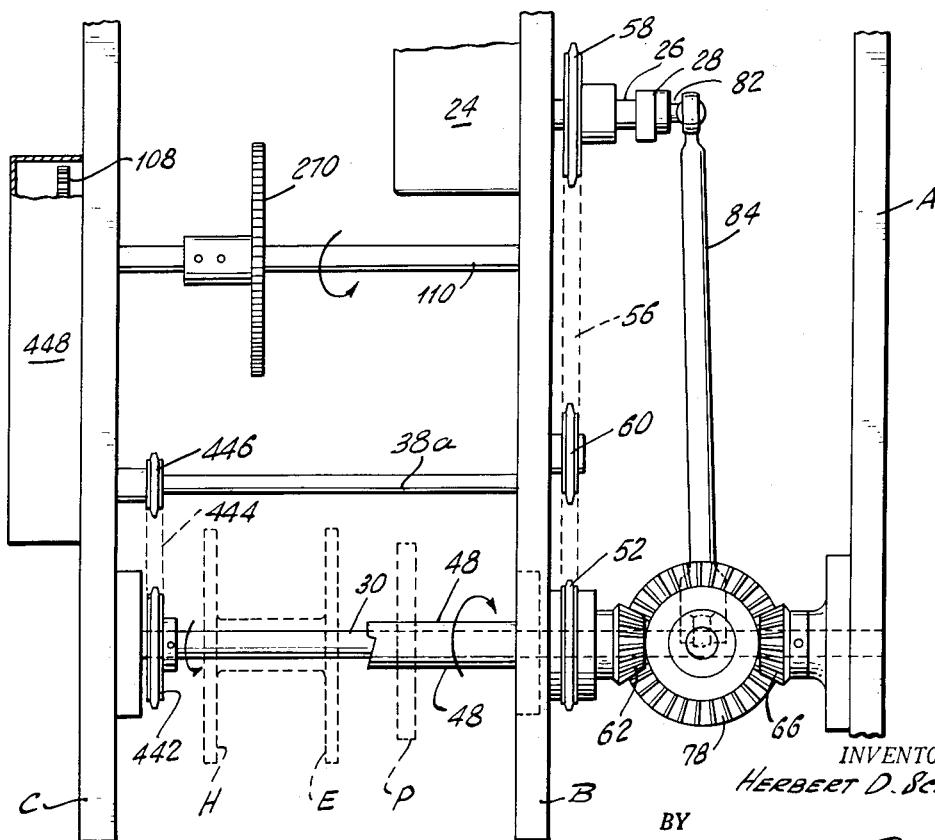
INVENTOR:
HERBERT D. SCHARF.
BY
I. Jordan Funick
ATTORNEY:

United States Patent Office

2,756,619
Patented July 31, 1956

2,756,619

WIRE CUTTING AND STRIPPING MACHINES

Herbert D. Scharf, Brooklyn, N. Y.

Application July 18, 1952, Serial No. 299,536

33 Claims. (Cl. 81—9.51)

This invention relates to wire cutting and stripping machines and more particularly to machines for cutting predetermined lengths of insulated wire and stripping predetermined lengths of insulation from the ends of said cut wire.

The present application is a continuation-in-part of my copending application Serial No. 789,441, filed December 3, 1947, now abandoned.

The purpose of the present invention is to provide an improved wire cutting and stripping machine whereby insulated wire from a supply reel or the like may be automatically cut into desired lengths with substantially simultaneous stripping of the insulation from the ends of said cut lengths of wire, said machine having a very high output and being adjustable to cut insulated wire over a wide range of lengths.

Previous machines which have cut and stripped insulated wire have utilized a complex and cumbersome wire advancing means to pick up and draw each length of wire to be cut and stripped, this mechanism being time consuming and entailing complexities of operation.

The machine of the present invention, however, comprises a completely coordinated feeding, cutting and stripping arrangement whereby the wire is fed positively by a power feed mechanism toward the cutting knives and the cut and stripped sections of wire are ejected freely into a suitable receptacle. This novel and coordinated positive feed mechanism makes possible a hitherto unrealized high output of cut and stripped wires. Also, this novel positive feed mechanism is capable of being easily adjusted to feed wires of any desired length ranging from the order of 3/4 inch to about six feet and over.

The present invention also provides novel coordinated mechanism which are arranged to cut and strip the insulated wire on the basis of differential movements in the wire feed and other cutting and stripping mechanisms. The wire is fed to a set of cutting and stripping knives which are actuated to sever the insulated wire as well as to cut the insulation only to a desired length from the point of severance, after which the wires on either side of the sets of knives are given a suitable motion to draw the cut insulation from the ends of the wire.

It will be understood herein that the wire still connected to the feed reel and passing through the feed mechanisms, will be known as the upstream wire, while the portion of wire that has been cut by the cutting mechanism and which is ejected therefrom will be known herein as the downstream wire. Immediately after the knives have been actuated to sever the wire, and to cut the insulation, the knives are maintained in their closed position for a short duration of time during which the motion of the upstream wire is altered relative to the upstream stripping knives or it is retracted by a reversal of the feed mechanism in order to draw off the insulation from the end of the upstream wire against the resistance of the upstream stripping knives. At substantially the same time or soon thereafter, the downstream wire is moved away from the closed downstream stripping knives to draw off the insulation from the end of said downstream wire. After the cutting and stripping takes place, the sets of cutting and stripping knives are moved out of the cutting position and are opened up and a new portion of wire to be cut and stripped is fed toward a position to which the cutting and stripping knives are moved to perform the next cutting and stripping action.

Another feature of the invention is a novel trunnion mechanism which operates two counter rotating coaxial shafts whereby several different coordinated mechanisms are actuated. This provides for the intermittent stopping of part of the mechanism for the purpose of actuating the cutting and stripping knives while said knives are in one place. Thus, this first trunnion mechanism provides for one portion of the mechanism to rotate uniformly and continuously while another portion of the mechanism is stopped periodically, both of said mechanisms being coordinated whereby the continuously rotating portion is operative upon the intermittently stopped portion to actuate certain mechanism while said second portion is at a dwell in its cycle of operation.

A second trunnion mechanism is provided in some embodiments of the present invention whereby the wire feed mechanism is periodically stopped and reversed for a short distance in order to perform the stripping of the upstream wire, this second trunnion mechanism being linked to the power source of the first trunnion mechanism whereby both are coordinated on a time cycle basis to provide the proper overall cutting and stripping action of the machine.

A further feature of the invention is the provision of a novel form of cutting and stripping knives wherein lower nibs are provided on said knives to provide a platform upon which the wire to be cut and stripped is laid just prior to the actuating of the cutting and stripping knives. Also, means are provided on said knives to align the wire properly between them, and to prevent the nicking or cutting of the conductor of said wire by the two pairs of stripping knives.

Further retaining means are also provided to virtually enclose the wire between the knives after it is fed between the cutting and stripping knives.

Another feature of the invention is the provision of a positive scrap ejecting mechanism for removing pieces of stripped insulation that may become lodged between the cutting and stripping knives, said ejecting mechanism being actuated by linkages to the first mentioned trunnion mechanism.

It is the general purpose of the invention to provide in all of its embodiments a differential in linear speed between the wire feed mechanism relative to the cutting knives, whereby either the wire feed mechanism is stopped while the knives move to pull the insulation off the end of the upstream wire with a further differential of linear speed being provided by the gripping mechanism which moves in advance of the sets of knives to pull the insulation off the end of the downstream wire.

Another means of providing this differential in linear speed is to have the knives stopped in their motion while the upstream wire feed is reversed, thereby pulling the upstream wire back from the stripping pair of knives to remove the insulation therefrom and with the same provision for the actuation of gripping means pulling the downstream wire away from the other pair of stripping knives.

Still other objects and advantages of my invention will be apparent from the specification.

The features of novelty which I believe to be characteristic of my invention are set forth with particularity in the appended claims. My invention itself, however, both as to its fundamental principles and as to its particular embodiments, will best be understood by reference to the specification and accompanying drawings, in which:

Figure 1 shows a plan view of the machine and its driving means, several parts being omitted for the sake of clarity;

Fig. 2 is a front elevation of Fig. 1, looking in the direction of arrows 2—2 of Fig. 1;

Fig. 3 illustrates an enlarged vertical partial cross-sectional view of the wire feed arrangement, and taken approximately on line 3—3 of Fig. 1, parts being omitted and broken away;

Figure 8:
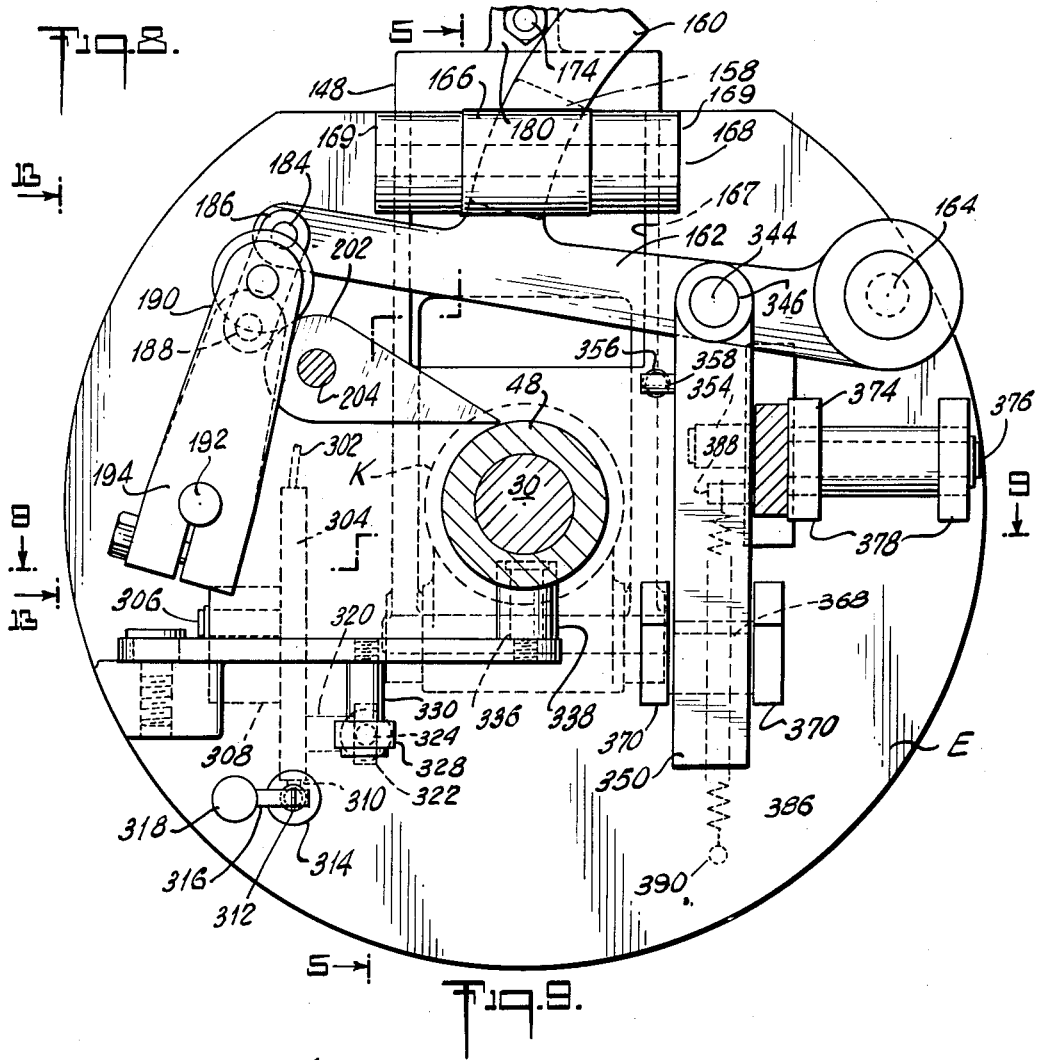
Figure 9:
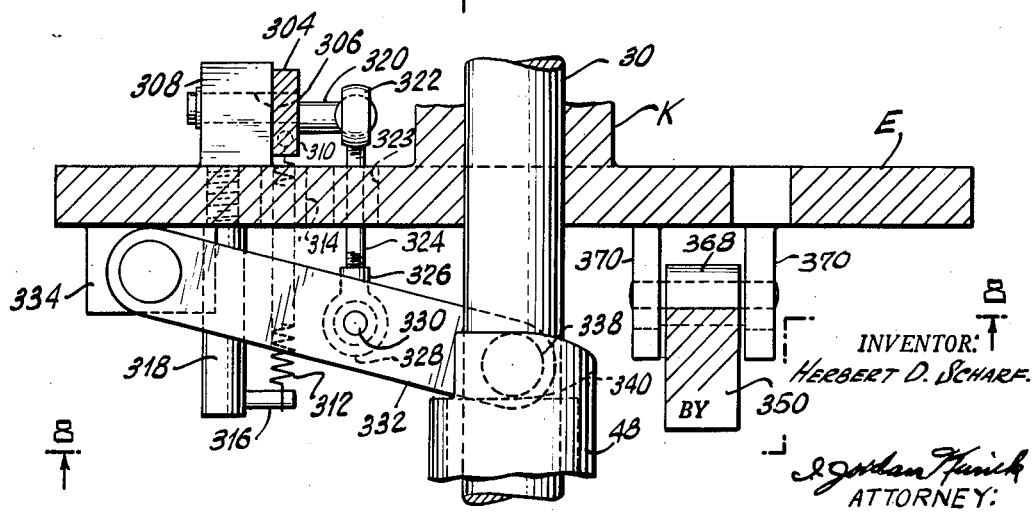

Figs. 4a to 4e inclusive, illustrate diagrammatically a progressive series of steps of the wire cutting and stripping means;

Fig. 4f is a side view of an insulation cutting and stripping knife;

Fig. 4g is a top view partially in section taken on line 4g—4g of Fig. 4f;

Fig. 5 is an enlarged vertical cross section view, some parts being broken away and in elevation and other parts being omitted, of the operating mechanism, taken on lines 5—5 of Fig. 1 and Fig. 8, respectively;

Fig. 6 shows a vertical partial cross section through the operating mechanism, parts being omitted or broken away for clarity, and taken on line 6—6 of Fig. 5;

Fig. 7 is a view similar to Fig. 6, but taken through another portion of the operating mechanism and taken on line 7—7 of Fig. 5;

Fig. 8 is a view similar to Figs. 6 and 7, through still another part of the operating mechanism and taken on line 8—8 of Figs. 5 and 9;

Fig. 9 shows a plan view, partly in elevation and partly in section, of the elements shown in Fig. 8 and taken on line 9—9 of Fig. 8;

Fig. 10 shows a view similar to Figs. 6, 7 and 8, and taken on line 10—10 of Fig. 5;

Fig. 11 is a fragmentary plan view of some of the elements shown in Fig. 10;

Fig. 12 is a fragmentary detail view taken through a detent mechanism, associated with the gripper jaws and taken on line 12—12 of Fig. 11;

Fig. 13 is a fragmentary view in elevation, taken along line 13—13 of Fig. 8; and Fig. 14 is a fragmentary plan view, shown diagrammatically, of another embodiment of the invention.

Referring to the drawings, in which like reference numerals indicate similar parts, Fig. 1 shows a plan view of the machine which is mounted in three parallel spaced apart vertical frames which are designated as frames A, B and C positioned on platform D.

Operative power for the machine is provided by an electric motor (not shown) which is connected by way of belt 20 and pulley 22 to a gear reducer 24 which in turn operates to rotate drive shaft 26 at constant speed. Shaft 26 is journalled through frame B by means of suitable bearings. A crank arm 28 is connected to and rotated by shaft 26.

A driven shaft 30, which carries the cutting and stripping mechanism, is journalled in bearings 32, 34 and 36 positioned in frames A, B and C, respectively. A second driven shaft 38, which operates the wire feed mechanism, is journalled in bearings 40, 42 and 46 positioned in frames A, B and C, respectively. Sleeve 48 is mounted coaxially over shaft 30 and is freely and independently rotatable thereover. A similar sleeve 50 is mounted coaxially over shaft 38 and is freely and independently rotatable thereover. Connected respectively to sleeves 48 and 50 and rotating therewith are sprockets 52 and 54. Driving power for sprockets 52 and 54 is furnished by a link chain 56 which engages the teeth of said sprockets as well as those of sprocket 58 connected to and rotated by shaft 26. Idler sprocket 60 is suitably journalled in frame B and serves to take up slack in chain 56. Sleeves 48 and 50 rotate at the same constant speed as shaft 26 and in the same direction.

Connected respectively to sprockets 52 and 54 and rotating therewith are driving bevel gears 62 and 64. Driven bevel gears 66 and 68 are suitably pinned to shafts 30 and 38, respectively, and rotate therewith.

Trunnions 70 and 72 are mounted over shafts 30 and 38, respectively, intermediate frames A and B, and oscillate independently of the rotation of said shafts.

Each of said trunnions has an upwardly extending shaft portion 74 and 75, respectively, around which sleeves 76 and 77 are freely rotatable. To the lower ends of sleeves 76 and 77 are connected differential idler gears 78 and 80, respectively, said gears being arranged to mesh operatively with the respective pairs of bevel gears 62, 66 and 64, 68.

Thus, the rotational motion imparted to bevel gears 62, 64 is reversed by idler gears 78, 80 to produce an opposite rotational motion on bevel gears 66, 68, respectively, and consequently on shafts 30, 38.

Idler gears 78 and 80 are maintained in mesh with their respective pairs of bevel gears either by means of a suitable bearing (not shown) mounted on shafts 74, 76 or by means of a recessed shoulder (not shown) in said shafts, said bearings or shoulders being positioned above said gears and preventing any upward movement thereof.

By means of this trunnion-gear arrangement, power is derived from drive shaft 26 to rotate shafts 30 and 38. If idler gears 78 and 80 do not oscillate and remain in one position, then shafts 30 and 38 rotate at constant speed in accordance with the power derived from drive shaft 26 which rotates at constant speed. In the embodiment shown in Fig. 2, shafts 30 and 38 rotate clockwise while shaft 26 rotates counterclockwise.

Since trunnions 70 and 72 are freely rotatable around shafts 30 and 38 respectively, any oscillation thereof will also cause the oscillation of idler gears 78 and 80 respectively, whose sleeves 76 and 77 surround trunnion shafts 74 and 75, respectively.

In order for certain mechanisms on or associated with shafts 30 and 38 to perform various interrelated intermittent and periodic functions for the feeding, cutting and stripping of the wire, it is necessary, however, that the rotational motion of said shafts be effectively differentially varied during a certain portion of each revolution of shaft 26.

The cutting and stripping mechanism must, at a certain selected portion of the rotational cycle, move relatively faster than the mechanism that feeds the wire to the cutting and stripping mechanism. This condition is satisfied either by arranging a differential in speed of the two mechanisms in the same direction or by stopping the cutting and stripping mechanism and reversing the feed mechanism.

Although the relative rotational motions of shafts 30 and 38 may be varied, there is maintained, in at least one embodiment, a one-to-one ratio of angular revolutions percycle between shaft 26 on the one hand and shafts 30 and 38 on the other. As between shafts 30 and 38, however, the relative difference in angular rotation during a certain period of each cycle is in favor of shaft 30. In other words, during a certain period, shaft 38 is required to rotate faster than shaft 30.

One preferred arrangement requires that shaft 30 stop rotating for a very short interval of time during which the cutting knives are actuated to cut a stationary wire. Under this condition, it is required that shaft 38 stop its rotation at the same time as shaft 30 is stopped and then actually reverse its rotation for a short interval while shaft 30 is at a dead stop. This is necessary in order that the upstream wire be pulled rearward from the knife assembly in order to strip the insulation off the cut end of the upstream wire.

This differential variation of the rotation of shafts 30 and 38 is accomplished by oscillating trunnions 70 and 72 by means of a connecting rod linkage to shaft 26. This linkage comprises a crank pin 82 connected to the end of crank arm 28 and extending perpendicularly therefrom. Pivotally connected to crank pin 82 are a pair of parallel connecting rods 84 which extend forward and are pivotally connected to rod end bearing 86, the downwardly directed extension of which is threaded adjustably in a central threaded aperture (not shown) of trunnion shaft 74 and which may be locked in position to any suitable depth by nut 88 threaded on said extension and turned down on the top of shaft 74.

Pivotally connected at one end to rearward portions of links 84 is a connecting rod 90 whose forward end is pivotally connected to rod end bearing 92, the downwardly directed extension of which is threaded adjustably in a central threaded aperture (not shown) of trunnion shaft 75 and which may be locked in position to any suitable depth by nut 94 threaded on said extension and turned down on the top of shaft 75. It is apparent that by these means the distance between the pivot points of rod end bearings 86, 92 and the axes of shaft 30, 38, respectively, may be readily adjusted.

Under this arrangement with shaft 26 rotating at constant velocity, should the trunnion assemblies be stationary, shafts 30 and 38 would simply revolve at the same constant angular speed as shaft 26. Since, however, it is necessary for shafts 30 and 38 to rotate at a non-constant speed, an oscillating motion is imparted to the trunnion assemblies by means of connecting rods 84 and 90, and depending upon the direction of said oscillation, the instantaneous relative speeds of rotation of shafts 30 and 38 will either increase or decrease. If trunnions 70, 72 are arranged to move at respective predetermined ratios with respect to the rotational speed of shaft 26 and in the same direction, then shaft 30 can be caused to remain stationary for a certain period of time while shaft 38 can be caused to reverse in rotational direction for a short interval of a cycle of rotation. The stopping of the rotation of shaft 30 is required in order to permit the cutting and stripping knives to operate upon a stationary wire, while the reversing of shaft 38 is required in order to strip the insulation off the upstream wire as will be described hereinafter.

The differential rotational action of shafts 30 and 38 is accomplished by the crank 28 and rods 84 and 90 arrangement which coordinates the respective motions of the three shafts. Rods 84 and 90 operated by crank arm 28 impart an oscillating motion to the two trunnions associated with shafts 30 and 38, respectively, and by proper dimensioning of the length of rods 84 and 90, of crank arm 28, and of the over-all lengths of the trunnion assemblies including the trunnion extension shafts 74, 75, and rod end bearings 86, 92, shaft 30 can be stopped at one point of its rotational cycle, while shaft 38 may be reversed while shaft 30 is motionless, for the required portion of each revolution of shaft 26. Also the distances between shaft 26 and shafts 30 and 38, respectively, are factors involved in controlling the variation in the speeds of shafts 30 and 38. By means of this trunnion-gear oscillating linkage, many variations of shaft rotational differentials may be accomplished and controlled.

The movements of trunnions 70, 72 serve to add or subtract to the radian displacement of shafts 30, 38, depending upon the direction of motion of said trunnions. When the trunnions 70, 72 move in the same direction as sprockets 52, 54, then the radian motion of the trunnions is substracted from the motions of the sprockets. In one embodiment the radian motion of trunnion 70 is equal to the radian motion of sprocket 52 per unit of time, and the resultant radian motion of shaft 30 is substantially zero, thus effectively stopping its rotation during a portion of the rotational cycle established by each cycle of rotation of shaft 26.

And when a radian motion is produced on trunnion 72 which is greater than the radian motion of sprocket 54 in the same direction per unit of time, then shaft 38 will be reversed in rotation for a certain portion of the rotational cycle of shaft 26.

Alternately when trunnions 70, 72 move in a direction opposite to that of sprockets 52, 54, respectively, the motions of each are added thereby producing an acceleration of the rotation of shafts 30 and 38 during the period of the motion of the trunnions. This acceleration during a portion of the rotational cycles of shafts 30 and 38 permit them to catch up with the cyclic rotation established by shaft 26. Thus the cyclic rotations of shafts 26, 30 and 38 bear a 1:1:1 ratio toward each other.

The wire feed mechanism is controlled by the rotation of shaft 38. A suitable gear train comprising gears 102, 104, 106 and 108 meshed together are mounted on frame C, gear 102 being connected to and rotated by shaft 38 and gear 108 being connected to and producing the rotation of wire feed shaft 110 journalled in bearings 112 and 114 mounted on frames B and C, respectively.

Gears 104 and 106 are mounted on shaft 101 rotatably positioned in bar 103 pivotally connected on one end to frame C. Pivotally connected to the other end of bar 103 is a generally vertical rod 105 extending freely through a suitable aperture in the top horizontal flange of frame C. Threadably engaging the top of rod 105 is a collar 107 which rests on top of said frame flange and is adapted to raise and lower rod 105 and accordingly bar 103 and gears 104 and 106. Collar 107 may be fixed in position by a suitable set screw or the like.

Gears 104 and 106 are readily replaceable in bar 103 with other gears having different relative diameters while gears 102 and 108 may likewise be replaced. Hence, it is apparent that the rotational ratio between shaft 38 and shaft 110 may be changed as required, depending upon the length of wire feed desired. A simple adjustment of collar 107 ensures that gears 104, 106 will easily be brought to and maintained in mesh with gears 102 and 108, respectively, with a minimum of back lash in the gear train. It is apparent that a reversal in rotation of shaft 38 will be accompanied by a reversal in rotation of shaft 110, the degree of reversal of shaft 110 being determined by the gear ratios selected in the gear train just described.

The actual wire feed mechanism will be described below in conjunction with the description of the cutting and stripping operation.

The cutting and stripping mechanism of the machine is mounted upon and rotates with shaft 30. Referring to Fig. 5, two substantially parallel disks E and H are connected on sleeve K which is mounted around and attached by means of set screw 119 or otherwise to shaft 30 with which it rotates. Hence disks H and E rotate with shaft 30.

Suitably secured by bolts or otherwise to the inside face of disk H near its perpihery is a U shaped knife holder 120 which rotates with said disk around shaft 30. The parallel arms 122 of knife holder 120 support pin 124 which in turn carries three substantially parallel knives 126, 128 and 130 (Figs. 4 and 6) extending with their cutting edges toward disk E. Said knives are maintained in their spatial relationship by means of suitable cylindrical spacers (not shown) placed on pin 124. Pin 124 is threadably engaged by nut 125 (Fig. 1) to maintain said knives locked in position.

Knives 126, 128, 130, each have a slot 132 which permits said knives a certain small amount of lateral movement relative to frame H whereby said knives may be adjusted in position to accommodate different wire and insulation sizes.

A matching set of substantially parallel knives 136, 138 and 140 (Figs. 1, 4, 10) each having a slot 142 are supported by pin 144 mounted between the parallel arms 146 of a movable knife holder 148. Pin 144 is threadably engaged by nut 145 to maintain said knives locked in position. Here also the knives are maintained in their proper spatial relationship by means of cylindrical spacers 146 placed on pin 144, said spacers being similar to those on pin 124.

The lower portions of arms 146 extend one on each side of sleeve K and terminate in a pivotal connection in pin 150 mounted in bracket 152 anchored in sleeve K. (See Figs. 1, 8, 10.) The pivoting action of arms 146 causes knives 136, 138, 140 periodically to approach and operatively engage knives 126, 128, 130 by means of an oscillating mechanism hereinafter to be described.

Referring to Figs. 4a, b, c, d, and e, it will be seen that the respective pairs of blades 126, 136, and 130, 140, operate to cut through the insulation 131 only of the wire being fed from the left, and said pairs will be designated herein as the stripping knives, while blades 128, 138 operate to cut through both the insulation and the wire conductor 133. The opposing edges of these pairs of blades each have sharp U or V notches which perform their cutting action. Fig. 4a through Fig. 4e show a top section view of the knives, said section being taken at substantially the apices of said notches.

The lower edge of each knife has an extended nib portion 152 and with each opposing pairs of knives these nibs overlap each other for all positions of the knives to form a platform upon which the wire may rest when it is paid out between the knives just before being cut.

It is apparent that the knives are replaceable at will by disengaging nuts 125, 145 from pins 124, 144, respectively, and removing said pins from their respective knife holders. Thus when different types of wires with different insulation and conductor thickness are to be cut and stripped, the knives are readily interchangeable with different sets of knives. Also the spacers between the knives may be changed when different lengths of insulation are to be removed from the ends of the wire.

Attached on the side of each stripping knife 130, 140, 126, 136, is a plate 127 having a projection 129 extending forward towards the U-shaped cutting section of the knives (Figs. 4f and 4g). (This was not shown in Figs. 4a to 4e for the sake of clarity.) The forwardmost end of said projection is positioned a slight distance behind the U-notch cutting edge of the knife as shown in the side view of Fig. 4f. The function of projection 129 is to provide a stop against which the periphery of insulation 131 of the wire abuts as shown in the partially cross sectional view of Fig. 4g. Thus, said projections serve to align the wire properly within the U-shaped cutting portions of the knives as well as to prevent the cutting edges of the stripping knives from cutting or nicking the conductor 133 of the wire.

After the wire has been severed, the three sets of knives remain in their closed position for a short time (Fig. 4d) while both downstream and upstream wires are pulled away from said knives thereby stripping insulation pieces 135, 137 from the respective ends of said wires.

In order to provide for the actuation of the knives, bracket arms 154 are attached on the back of knife holder 148 (Fig. 5) and carry an idler roller 156 against which a wedge shaped cam 158 operates, said cam being attached on one side of side arm 160 on link 162 pivoted on pin 164 connected to the outer face of frame E (Fig. 8). A suitable opening 167 is provided in frame E to permit cam 158 to operate upon roller 156.

The other side of arm 160 (Fig. 8) is backed up by roller 166 rotating on pin 168 supported by bracket 169 attached to frame E (Fig. 5). Roller 166 serves to maintain link 162 oscillating on pin 164 in a plane substantially parallel to disk E.

Connected on one end to pin 170 on bracket 169 are springs 172 (Figs. 1 and 5) whose other ends are connected to pins 174 on the top of knife frame 148. Springs 172 serve to pull knife frame 148 toward disk E, thereby normally maintaining the two sets of knives separated as shown in Fig. 4a.

In the showing of Fig. 5, wedge cam 158 is shown in position where it has been raised to its extreme upward limit of its motion, effectively closing the two sets of knives against the action of springs 172 to the predetermined stop setting provided by the respective heads of screws 176 and 178, screw 176 being threadably attached to extension 180 on knife frame 148 and screw 178 being threadably attached to extension 182 on frame 122. These screws may be adjusted to provide positive and accurate closing of the knives as shown in Fig. 4c. The adjustability of screws 176, 178 also permits the accommodation of different wire sizes to be cut by the knives.

The linkage for actuating the cutting knives will now be described. Connected to the end of link 162 opposite pivot pin 164 (Fig. 8) is a pin 184 to which a conventional roller chain connecting link 186 is pivotally attached. The other end of link 186 is attached to pin 188 on the end of link 190 (also Fig. 13) which is pivotally attached to shaft 192 by means of sleeve 194 (see Figs. 6, 10), shaft 192 being rotatably supported by bearings (not shown) in disks H and E (Fig. 1).

Sleeve 194 has another pivotable link 196 having a cam roller 198 connected to its outer free end (Fig. 13).

Referring to Figs. 5 and 7, a disk P is attached to sleeve 48 which rotates at a constant angular velocity in a direction opposite to that of shaft 30 which carries the rotating H—E disk assembly. A wedge cam 202 movable parallel to the left face of disk P is pivotally connected to shaft 204 rotatably extending through said disk P. Connected to the right end of shaft 204 on the right face of disk P (Fig. 5) is gear 206 which meshes with gear 208 which oscillates rotatably over pin 210 anchored in disk P.

Attached to gear 208 and pivotable on pin 210 is link 212 on the outer extremity of which is a laterally extending pin 214. Spring 216 connected at one end to pin 218 on link 212 and on its other end to pin 220 in disk P normally operates to move pin 214 radially outward from sleeve 48 while at the same time through the action of gears 208 and 206, wedge 202 is likewise normally urged outward from sleeve 48.

Referring to Fig. 7, assuming cam roller 198 in position x advancing in its motion counterclockwise, pin 214 is pressed toward the center of the axis of rotation of disk P by the action of spring 222 tensioned between two pins 224, 226 on frame B. (See also Fig. 1.) This occurs once during each cycle of operation as pin 214 comes around to meet that spring. This also causes wedge cam 202 to swing toward sleeve 48 through the interaction of gears 208 and 206.

Just prior to the beginning of this operating cycle, a predetermined length of wire has been laid between the separated sets of knives (see Fig. 4a) and lies supported on the lower overlapping nibs 152 of said knives as shown in Fig. 4a.

Shaft 30 is now approaching an instantaneous position of dwell. Cam 228 attached to disk P rotates clockwise (Fig. 7) at a constant angular velocity and its function will be described hereinbelow. When shaft 30 has come to the instantaneous dwell portion of its cycle, cam roller 198 has ridden up over the incline of cam 202 to substantially the position outlined at y. The effect of this motion has been operating through link 196, sleeve 194, and link 190, link 186, link 162 (Fig. 13), to actuate wedge cam 158 (Fig. 5) of link 162 to move knife holder 148 toward disk H to close the sets of knives. The wire that was between the knives has now been severed by this action as shown in Fig. 4b.

Referring to Figs. 6 and 10 gripper jaw 240 is pivotally connected by means of pin 242 in the inside face of disk H and is movable toward and away from stripping knives 130, 140 in knife holder 120. Gripper jaw 244 is pivotally connected by means of pin 246 to jaw 240 and is movable relative to jaw 240 with which it cooperates at an angle of approximately 45°. See Fig. 11.

Jaw 244 has a lower extension 248 below pivot pin 246. Link 250 is connected on one end to collar 252, which is free to rotate around extension 248, and is adapted to urge jaw 244 pivotally toward jaw 240 to grip the wire between them as shown in the sequence of Figs. 4a to 4c.

The other end of link 250 is connected to pin 254 which is connected through a rod end bearing 256 and which has a screw 258 to provide for adjusting the pivotal rotation of jaw 244. The lower end of rod end bearing 256 is bolted to a split sleeve 260 surrounding and rotating with shaft 192. The oscillatory rotation of shaft 192 causes the closing and opening of jaws 240, 244 to grip and release the downstream wire to strip it. The timing of the oscillation of shaft 192 is coordinated with the operation of the cutting and stripping knives as will be described hereinafter.

The successive closing of the jaws and the stripping of the wire as indicated in Figs. 4a, b, c, d and e is concurrent with the closing of the knives as depicted in said Figs. 4a to 4e.

The actual gripping of the wire in said sequence is so adjusted by its linkage to become effective after the knives have come to a full cutting stop by the abutment of screw 176 against screw 178 (Fig. 5).

In the same period of time when roller 198 has advanced from position x to y (Fig. 7), the reversal in rotation of feed shaft 38 through gear train 102, 104, 106, 108 (Fig. 1) causes shaft 110 to reverse in rotation. In some embodiments shaft 110 may be decelerated in order merely to maintain a differential in angular rotation relative to the rotation of shaft 30. (See Fig. 3.) A wire feed wheel 270 is attached to and rotated by shaft 110.

Over the peripheral surface of feed wheel 270 (Fig. 3) which is always in positive control of the wire feed, an insulated wire 272 is fed from a supply reel (not shown) through a flexible tube 274 toward the cutting knives on shaft 30.

The exit end of tube 274 is positioned in such a manner that wire 272 is fed between the two opposing sets of knives just above nibs 152 which support the wire in position thereby preventing the wire from falling downward toward shaft 30, said knives having arrived at that time at the top of their revolution and passed substantially over shaft 30. The vertical height of the opposing faces of the knives form the side means of restraining the wire between them.

Tube 274 is supported by link 276 which is pivotally attached by means of pin 278 to bar 280 which is pivotally connected to the tie rod 282 connected between frames B and C. See also Fig. 1. Connected on one end to link 276 is a spring 284 whose other end is connected to frame C, urging said link upward toward said rod.

A screw stud 286 threaded through bracket 288 attached to link 280 is arranged to adjust link 276 and tube 274 upward or downward in order that the wire feed mechanism may position the wire properly between the knives and just above the extended but never separated nibs 152 of the knives. When a proper adjustment has been made, screw stud 286 may be locked in position by nut 290.

Also rotatably connected to link 280 by means of pin 278 is an idler wheel 292 having peripheral flanges which overhang the periphery of feed wheel 270, thereby maintaining the engagement of said wire between the respective peripheral surfaces of said wheels.

Wheel 292 is urged against wheel 270 by means of spring 294, one end of which is connected to the rearward end of link 280 and at its other end to a suitable bracket on platform D upon which the machine stands.

The wire is drawn from a supply reel (not shown) through an eye bolt 296, or by other suitable guide means, toward the rolling contacting peripheral cooperating surfaces of wheels 270 and 292. It can be seen that wire 272 is given a positive forward controlled motion by said wheels which may be reversed after the knives in the knife holders have closed by means indicated hereinabove in order to strip the end of the upstream wire still connected to the supply reel.

The wire feed mechanism described herein is capable of feeding different lengths of wire to be cut and stripped, as desired. By varying the size of gears 102, 104, 106 and 108, controlled intermittent feed of wire varying in any desired length from the order of one-half inch to lengths in the order of six feet and over, may be accomplished. Wire feeds in these ranges have been achieved in actual operation of the machine described herein. Fractional as well as multiple rotation of shaft 110 and accordingly wheel 270 is readily arranged by modifying the gear train between shaft 38 and shaft 110. The length of the wire feed may also be adjusted by replacing wheel 270 with wheels having different circumferences.

After the predetermined length of wire has been paid out by the feed mechanism into the space between the knives, the latter, which are now substantially motionless, are actuated to cut the wire. By means of the double trunnion mechanism described hereinabove, shaft 30 is stopped instantaneously as the knives are actuated to cut the wire while shaft 110 is also brought to a stop so that the knives operate on a motionless wire. See Figs. 4a, b and c.

As soon as knives 128, 138 have completely severed the wire, and knives 126, 136 have cut the insulation from the upstream wire which comes from the feed mechanism, the latter is reversed in motion by means of the trunnion mechanism associated with shaft 38 thereby pulling back the upstream wire as shown in Fig. 4d to effect the removal of the insulation from the cut end of the upstream wire. This is accomplished by keeping knives 126, 136 sufficiently closed about the wire to resist the backward pull of the upstream wire against the cut piece of insulation between knife pairs 126, 136 and 128, 138.

It is desirable to arrange the wire feed to position the wire between the knives in such a manner that a complete and positive enclosure is provided for the wire. This is accomplished in part by the vertical opposing sides of the sets of knives and the overlapping lower nibs 152 of said knives.

The wire is prevented from whiplashing upward and out from between the knives by means of a hooked finger 302 (Fig. 10) which is adapted to be moved into position over the wire between the knife frames and gripper jaws 240, 244 (Fig. 6). In this manner a virtually complete enclosure is formed by the opposing edges of the sets of knives, lower nibs 152 and finger 302, thereby preventing the wire from escaping from between the knives while all the rapid movements of the machine are taking place.

Finger 302 is connected to arm 304 pivotally attached by means of pin 306 to bracket 308 on the inside face of disk E (Fig. 9). Arm 304 has a lower extension 310 to which one end of spring 312 is connected. Spring 312 extends through aperture 314 in disk E and its other end is anchored on pin 316 connected to bracket 318 attached to the outside face of disk E. The action of spring 312 normally urges finger 302 into a position to enclose completely the wire between the knives to prevent its escaping therefrom.

Connected between arm 304 intermediate between extension 310 and pivot pin 306 is a screw stud 320 (Figs. 8 and 9) to the end of which is attached rod end bearing 322 having a male threaded stud 324 which extends through aperture 323 in disk E and which couples into a female threaded shank 326 of rod end bearing 328. Bearing 328 is pivotally connected by pin 330 to link 332 intermediate its ends. One end of link 332 is pivotally connected to bracket 334 on the outside face of disk E. The other end of link 332 which extends below shaft 30 has an upwardly extending pin 336 upon which cam roller 338 is mounted. Roller 338 cooperates with a helically contoured edge cam 340 in which sleeve 48 terminates and is actuated thereby to move link 332. The motion produced upon roller 338 is substantially longitudinal to the axes of shaft 30 and of sleeve 48.

Spring 312 urges roller 338 against the helical cam surface 340. When roller 338 is at its extreme distance from disk E, finger 302 is positioned to enclose the wire between the two sets of knives.

When cam roller 338 is urged toward disk E by the rise of cam surface 340 against the action of spring 312, finger 302 is thereby lifted away in order to permit the wire to be fed between the knives, as the assembly of disks H and E on shaft 30 rotates to bring said knives to the position substantially above shaft 30.

Sleeve 48 rotates in a direction opposite to that of shaft 30 and cam surface 340 is so shaped and synchronized relative to the rotation of shaft 30 and the rotating assembly of disks H and E, that finger 302 closes over the wire, just after it is fed out of tube 274 (Fig. 3) and between the opposing sets of knives as the knife assembly approaches and passes the discharge end of said tube. After the knives have the wire laced between them and the hooked finger 302 forms a virtual complete enclosure; then the disk assembly H—E on shaft 30 comes to a stop and the knife actuating mechanism described hereinabove comes into play.

In continuous successive operations of the cutting and stripping mechanism, the stripped ends of insulation 135, 137 are pushed out from between the sets of knives by succeeding cuttings of insulation. In some instances said cuttings may tend to become lodged between the knives and become jammed therein, thereby reducing its efficiency. Hence, in some embodiments of the machine it is desirable to introduce means for positively ejecting the scrap to free the knives for efficient operation.

During the interval when roller 198 moves approximately from position *x* to position *y* (Fig. 7), link 162 moves upward (Fig. 8). See also Fig. 13. Connected to link 162, (Figs. 5, 8) near its pivotal pin 164, is a stud (not shown) on the end of which is connected by means of bolt 344 a ball 346 of rod end bearing 348. The shank 350 of rod end bearing 348 extends in a direction substantially opposite to that of side arm 160 and wedge cam 158. The shank 350 of the rod end bearing has an undercut portion 352 which, when link 162 is actuated upward (Fig. 8) to close the sets of knives, is drawn over roller 354 (Figs. 5, 8) by the action of spring 356, one end of which is anchored to pin 358 on rod end bearing 348, the other end being anchored on pin 360 on the outside face of disk E.

Shank 350 has a lateral extension 362 having a substantially straight cam surface 364 and a lower inclined cam surface 366. Said cam surfaces 364 and 366 cooperate with roller 368 rotatably connected on a suitable pin to bracket 370 on the outside face of disk E.

When shank 350 moves upward (Fig. 5) by the action of link 162, cam surface 364, which has been in contact with roller 368, moves upward and permits shank 350 to move pivotally on its rod end bearing toward disk E. During this movement cam surface 366 rides up on roller 368 to the position shown in Fig. 5.

When shank 350 has pivotally approached disk E, undercut 352 has been drawn up and inward to come into engagement with roller 354, much in the same manner as a pawl and ratchet mechanism.

The resetting of the various mechanisms to a position to start the cutting and stripping cycle will now be described. Cam 228 attached to plate P (Figs. 5 and 7) has a spiral like internal cam surface 372 which engages roller 198, said roller rotating in one direction while said cam rotates in the opposite direction with sleeve 48. It is noted that plate P rotates in one direction with sleeve 48, while the assembly of disks H—E rotates in the opposite direction.

When roller 198 (Fig. 7) was previously actuated from position *x* to position *y*, the two sets of knives were closed by the upward movement of link 162 (Fig. 8) to cut the wire while the downstream wire was stripped by the actuation of the gripper jaws 240 and 244 to their outwardly extended position as depicted in Fig. 10. The actuation of said gripper jaws will be described in greater detail below.

The continuing rotations of shaft 30 and sleeve 48 to complete a cycle of operation resets roller 198 from the position *y* back to position *x* which is brought about by roller 198 following along cam surface 372. In so doing the gripper jaws 240 and 244 are reset to their initial position in close proximity to the leading pair of insulation cutting knives 130, 140.

Also, by this same action link 162 (Fig. 8) moves downward with wedge cam 158 on side arm 160 relieving its pressure on knife carriage 146 which is brought back toward the inside face of disk E, under the action of spring 172, thereby opening the sets of knives to receive the subsequent pass of wire to be cut and stripped. Also the undercut 352 of shank 350 has engaged roller 354 which is connected to link 374 pivoted on pin 376 supported in brackets 378 (Fig. 8) on the outside face of disk E.

When shank 350 now moves downward it causes undercut 352 to depress roller 354 thereby rotating link 374 radially around pivot pin 376 until the time when cam surface 366 rides downward on roller 368 thereby moving shank 350 radially outward against the action of spring 356 and disengaging cam surface 352 from roller 354. Said disengagement is completed just before cam surface 364 of extension 362 comes in contact with roller 368 to complete the outward motion of shank 350.

When roller 352 is depressed, the other end of link 374 moves upward (Figs. 5, 6). Attached to the outer end of link 374 is upwardly extending plate 380 at whose upper end is a threaded bolt 382 (Fig. 6) to the free end of which are attached two substantially parallel scrap ejecting blades 384, which extend between the spaced apart pairs of knives. When blades 384 are actuated they effectively cause any scrap insulation caught between the adjacent cutting knives to be ejected as indicated in Fig. 4*e*. The actuation of ejecting blades 384 occurs preferably when the sets of knives on disk assembly H—E have reached some position below shaft 30 so that the scrap may be ejected into a suitable receptacle below the machine.

The scrap ejecting action of blades 384 is approximately concurrent with the resetting of the cutting knives in knife holder 146 to the open position toward disk E. When cam surface 352 disengages from roller 354, spring 386 (Figs. 5, 8), attached at one end to pin 388 in link 374 and at its other end to pin 390 in disk E, causes link 374 to be drawn back to stop 402 connected to the inside face of disk H. This resetting action of link 374 causes ejecting blades 384 to be withdrawn sufficiently from between adjacent pairs of cutting knives so that there is no interference with the next cutting and stripping cycle of the knives as shown in Figs. 4*a*, *b*, *c* and *d*.

It is evident from Fig. 5 that the upward pivotal movement of link 162 causes the knives to close. On the other hand, the downward movement of said link causes said knives to open while simultaneously actuating the ejecting blades 384 from the linking originating from rod end bearing 346 attached to link 162.

After the cutting knives have been actuated to sever the wire and cut the insulation on both sides of the severance point, disk assembly H—E begins again to rotate again on shaft 30. In order to strip the downstream wire it is necessary that the gripper jaws 240 and 244 at that time move away from the leading pair of insulation cutting knives 130, 140 in order to pull the downstream wire away from said knives which have the cut piece of insulation retained behind them. See Figs. 4*c* and 4*d*.

The gripper jaws oscillate between two indexed positions. The indexing means is provided by a retaining tube 404 connected to the inside face of disk H (Figs. 11, 12) and containing an internal compression spring 406 having a ball 408 at its outer end. The shank of jaw 240 has a lateral extension 410 having two indexing surfaces 412 and 414 respectively (Figs. 11, 12), with which ball 408 cooperates alternately in order to fix the different positions of jaw 240, in the manner of a snap action toggle. When jaw 240 is closest to knife frame 120, then index surface 414 is engaged by ball 408, and when jaw 240 is pivoted farthest away from said knife frame, indexing surface 412 is engaged by ball 408.

While jaw 240 is positioned with ball 408 against index surface 414, the action of the linkage for gripper jaw 244 is put into motion at the proper time as described hereinafter whereby the lower end 248 of jaw 244 is pulled outward in the direction of rod end bearing 256 by the oscillation of shaft 192, thereby pivoting jaw 244 toward jaw 240. This pulling action closes the jaws upon the wire that has fed through the open knives into the space between said jaws and grips said wire.

After said jaws have closed upon the wire to grip it, shaft 192 continues to rotate, until the limit of the closing action of the jaws is reached and jaw 240 must yield to the pulling action overcoming the indexing pressure of spring 404 and ball 408, thereby causing jaw 240 to move outwardly from knife frame 120 to pull the downstream wire and strip the insulation from its end. Jaws 240, 244 continue to maintain their pressure gripping action upon the wire while ball 408 toggles from indexing surface 414 to indexing surface 412.

The limit of outward motion of jaw 240 is reached when, by the snap action toggle means, indexing surface 412 is engaged by ball 408 loaded by spring 406. The outward motion of jaw 240 may also be limited by the shank of jaw 240 abutting shaft 192, a suitable recess being provided in said shank.

The effective loading of spring 406 may be varied by means of screw 416 communicating with the internal aperture of retaining tube 404. The amount of pressure created by the gripper jaws on the downstream wire during the stripping action may be adjusted to the type of wire being stripped, this being accomplished by adjustment of the loading of spring 406 by turning screw 416.

As jaw 240 moves outward by the pulling action on its lower end 248, a point is reached in that motion when the pull on end 248 is stopped because shaft 192, the source of the pull, has reached the end of its angular oscillation. Jaw 240, however, does not quite stop its motion but continues its outward motion for a slight distance due to spring loaded ball 408 (Figs. 11 and 12) riding down the indexing surface 412, thus advancing jaw 240 a slight distance sufficient to open the gripper jaws, since jaw 240 overrides the traverse of the linkage from shaft 192 to the lower end 248 of jaw 244. This opening of the gripper jaws serves to eject the cut downstream wire as shown in Fig. 4e.

In resetting jaw 240 to its initial position adjacent knife frame 120, the action of the reverse oscillation of shaft 192 operates to rotate and to continue the opening of jaw 244. The opening rotation of jaw 244 is limited by an edge of said jaw abutting link 250 (Fig. 10) and the continued urging through the linkage from the rotation of shaft 192 is exerted through pin 246 upon jaw 240 thereby overpowering the detent action of ball 408 on indexing surface 412. Ball 408 is then toggled back to indexing surface 414 to maintain jaw 240 adjacent knife frame 120 to await the cutting and stripping of the next downstream wire.

Another embodiment of the principles of my invention is shown in Fig. 14 which is similar in some respects to that shown in Fig. 1, and wherein similar parts having similar functions are designated by the same reference numerals.

In this embodiment of Fig. 14, the second differential trunnion mechanism which was operatively connected to shaft 38 (Fig. 1) is now omitted. Instead, a shaft 38a is provided suitably journalled in frames B and C, said shaft being rotated by power taken from shaft 30 by way of sprocket 442, pinned to shaft 30 and operatively connected by way of roller link chain 444 to sprocket 446 pinned on shaft 38a. Shaft 38a extends through frame C and operates a gear train (not shown) within gear box 448, the output of said gear train being connected to shaft 110.

It will be noted that in this embodiment (Fig. 14) no reversing of shaft 110 takes place. In order to provide for the stripping of the upstream wire, however, the gear train ratio is selected whereby the linear speed of the cutting knives of disk assembly H–E is in excess of the linear speed of the wire fed from the perimeter of feed wheel 270. Hence, the motion of the cutting knives will accelerate more rapidly than the motion of the wire fed to the cutting knives. Therefore, this relative difference in motion will cause the cutting knives, particularly stripping knives 126, 136, to pull the cut insulation 135 off the end of the upstream wire.

It will also be noted that in the embodiment of Fig. 14, under the operation of the trunnion mechanism associated with shaft 30, both shafts 30 and 38, and consequently shaft 110, stop during each cycle of rotation and the stripping action of the upstream wire takes place because of the differential in speed between the feeding of the wire and the motion of the stripping knives when shafts 30 and 110 are started up again after the dwell. If the gear ratio were such that the linear speed of the wire advanced by wheel 270 were greater than the linear speed of the knife assembly, then no stripping of the end of the upstream wire will occur.

Hence, the relative difference in motion or differential speed between the wire feed and the stripping knives brings about the stripping of the upstream wire, while the stripping of the downstream wire is accomplished as in Figs. 1, 10, 11, and 12, by the differential in linear speed of the gripping jaws moving in advance and away from the stripping knives 130, 140.

The overall stripping action may be described as being accomplished in all embodiments by the provision of a differential in linear speed amongst the three elements, namely, the downstream wire, the cutting and stripping knives, and the upstream wire, the linear speeds of each being in descending order, as named.

In operation, wire 272 from the feed roll is laced and grasped firmly between rollers 270 and 292 and is extended through tube 274 to project over shaft 33 in position between discs H and E. Motor 24 is started and through the various linkages described hereinabove, the disc assembly H–E begins to rotate and brings the cutting knives to the top of their rotating motion, as shown in Fig. 3. The knife actuating means comes into play to sever the wire between the sets of knives at a time when the wire feed has substantially stopped. Immediately upon severing the wire while the disc assembly has stopped its motion, said assembly begins rotating again, causing the severing knives to strip the upstream wire which is substantially stationary at this time or in the process of retracting, as desired, while the gripper jaws 240 and 244 are set into motion to strip the downstream wire in advance of the linear motion of the knives. As disc assembly H–E rotates, the knives are moved out of the linear path of the wire feed, and the wire feed wheel 270 is started again to thrust another predetermined length of wire through tube 274 into position to be cut again when the knives again reach substantially the top of their motion on disc assembly H–E.

In the specification, I have explained the principles of my invention, and the best mode in which I have contemplated applying those principles, so as to distinguish my invention from other inventions; and I have particularly pointed out and distinctly claimed the part, mode or combination which I claim as my invention or discovery.

While I have shown and described certain preferred embodiments of my invention, it will be understood that modifications and changes may be made without departing from the spirit and scope thereof, as will be clear to those skilled in the art.

I claim:

1. Mechanism for cutting and stripping insulated wire comprising a power source, means connected to said source for projecting a predetermined length of wire from a supply to a wire severing and insulation stripping station, means connected to said source for severing the desired lengths of wire, the severed length of wire being designated the downstream wire, and the wire still connected to the supply being designated the upstream wire, means for moving said severing means away from the linear path in which the wire is projected towards and through said severing means after the wire has been severed, means connected to said source for cutting the insulation on the severed end of both the downstream and upstream wires, and means connected to said source for advancing the downstream wire to pull the insulation off its severed end.

2. Mechanism according to claim 1 wherein altering means are provided to reverse said projecting means to retract the upstream wire subsequent to actuating said severing and insulation cutting means.

3. Mechanism according to claim 1 wherein said feed means comprises a feed wheel adapted to advance said wire by projection by the rotation of said feed wheel, and means connected to said source for rotating said wheel a predetermined amount in accordance with the desired length of wire to be advanced.

4. Mechanism according to claim 1 wherein said feed means comprises a feed wheel adapted to advance said wire by projection by the rotation of said feed wheel, means connected to said source for rotating said wheel a predetermined amount in accordance with the desired length of wire to be advanced, and means connected to said source for reversing the rotation of said feed wheel in order to retract said wire after it has been severed to remove said insulation.

5. Mechanism according to claim 1 wherein the means for severing the wire and for cutting the insulation at the severed end of said wire comprise sets of oppositely opposed knife members having opposed vertical portions, a horizontally extending nib portion in the lower portion of each of said knives, said nib on each of said opposed knives being arranged to overlap each other on all positions of said opposed knives.

6. Mechanism according to claim 1 in which said means for severing the desired length of wire comprises a pair of opposing knives and wherein said insulation cutting means comprises a pair of opposed insulation cutting knives positioned on each side of said severing knives, each of said opposing wire and insulation severing knives having one set of nibs positioned at all times in sliding contact with each other, each of said insulation cutting sets of knives being spaced part from said severing knives by a distance substantially equivalent by the length of insulation it is desired to remove from each of the severed ends of the wire, actuating means connected to said source adapted to close the opposed sets of severing knives and insulation cutting knives, said insulation cutting knives being maintained in position by actuating means whereby the motion of the upstream and downstream wires relative to said cutting knives causes the insulation from said severed ends of the wires to be pulled off against the resistance of said insulation cutting knives.

7. Mechanism for cutting and stripping insulated wire comprising a power source, feed means connected to said source for feeding a predetermined length of wire from a supply, severing means connected to said source for severing the desired length of wire, the severed length of wire being designated the downstream wire and the wire still connected to the supply being designated the upstream wire, a drive for moving said severing means away from the linear path in which the wire feeds towards and through said severing means after the wire has been severed, cutting means connected to said source for cutting the insulation on the severed end of both the downstream and the upstream wires, said cutting means comprising knives each having a lower nib portion cooperatively overlapping a nib portion from an opposing knife in all positions of said sets of knives, whereby a platform is provided for the placement of a wire between said knives prior to the cutting and stripping action and further comprising a projection on each of the insulation cutting knives whose outer end is positioned behind the cutting portion of said knives a predetermined distance whereby said projections abut the outer periphery of the insulation of the wire and prevent the cutting edge of said insulation cutting knives from injuring the conductor of the wire, a device connected to said source for altering the motion of the feed means whereby the insulation is pulled off the severed end of the upstream wire, and mechanism connected to said source for advancing the downstream wire to pull the insulation off its severed end.

8. Mechanism for cutting and stripping insulated wire comprising a power source, feed means connected to said source for feeding a predetermined length of wire from a supply, severing means connected to said source for severing the desired length of wire, the severed length of wire being designated the downstream wire, and the wire still connected to the supply being designated the upstream wire, means for moving said severing means away from the linear path in which the wire feeds toward and through said severing means after the wire has been severed, cutting means connected to said source for cutting the insulation on the severed end of both the downstream and the upstream wires, said severing means comprising a pair of opposing knives, and wherein said insulation cutting means comprises a set of opposed insulation cutting knives positioned on each side of said severing knives, and a positioning finger near said knives and connected to said source and adapted to move in and out of a position over a wire that is fed between said opposing sets of knives to form a virtual frame around said wire, mechanism connected to said source for altering the motion of the feed means whereby the insulation is pulled off the severed end of the upstream wire and a device connected to said source for advancing the downstream wire to pull the insulation off its severed end.

9. A wire cutting and stripping machine comprising a rotatable shaft, a source of power for rotating said shaft, means for intermittently rendering said shaft substantially motionless, opposed cutting knives mounted on said shaft and rotatable therewith, separate means operating in time with the rotation of said shaft for moving said knives into and out of cutting position to sever predetermined lengths of wire positioned in front of said knives, and a wire feeding mechanism intermittently driven by said source of power in time with the rotation of said shaft to advance a wire a predetermined distance into position between said knife members before said knives are actuated.

10. Mechanism for cutting and stripping insulated wire comprising a power source, means connected to said source for projecting a predetermined length of wire from a supply, means connected to said power source for severing the desired length of wire and cutting the insulation only on both sides of the point of severance of the wire, the severed length of wire being designated the downstream wire, and the wire still connected to the supply being designated the upstream wire, means for moving said severing means along and away from the linear path of the wire being fed through said severing means after the wire has been severed, means connected to said source for altering the motion of the feed means whereby the insulation is pulled off the severed end of the upstream wire and means connected to said source for advancing the downstream wire to pull the insulation off its severed end after the severing and cutting means have been actuated, mechanical links between said power source and each of said means whereby a differential in linear speed is produced amongst the downstream wire, the severing and insulation cutting means and the upstream wire, the linear speeds of each of these elements respectively being in descending order as named.

11. Apparatus for cutting and stripping insulated wire comprising a power source, a source of wire, a rotary member, pairs of spaced cutting and stripping knives mounted on said member to cut and strip the insulation off the wire, a feed for projecting a predetermined length of wire from said source over said member to position the portion of the projected wire to be severed in the path of said cutting and stripping knives, means for actuating said cutting and stripping knives to sever the wire and the insulation adjoining the ends of the severed wire, a wire gripper for gripping the trailing end of the severed wire, means for advancing said severed wire to remove the insulation from the trailing end thereof, and means for effecting relative movement between said knives and the source of said wire to strip off the insulation from the wire that is held by said feeding means, and means for actuating said knives, strippers and grippers as the rotary member to which they are attached is rotated to move them into and out of actuating position in time with the feed of said wire.

12. Mechanism according to claim 1, wherein said severing means and insulation cutting means are connected to a rotatable shaft, said severing and cutting means being spaced apart from said shaft and rotated with said shaft, and further comprising means connected to said source for rotating said shaft periodically, said rotating means causing said shaft to stop intermittently during each periodic rotation of said shaft, means connected to said source to actuate said severing and cutting means during the time that said shaft is substantially motionless, said wire feeding means being adapted to render the wire motionless during the time when said shaft is motionless.

13. Mechanism according to claim 1 in which said means for severing the desired length of wire comprises a pair of opposed knives and wherein said insulation cutting means comprises a set of opposed insulation cutting knives positioned on each side of said severing knives, each of said insulation cutting sets of knives being spaced apart from said severing knives, actuating means connected to said source and adapted to close the opposed sets of severing and insulation cutting knives, and scrap ejecting means connected to said source and adapted to eject insulation stripped from the ends of the wires and caught between said severing knives and said insulation cutting knives, said scrap ejecting means comprising a member movable between said set of severing knives and each of said sets of insulation cutting knives, said scrap ejecting means being actuated after said severing and insulation cutting knives have been actuated.

14. A machine according to claim 9, and further comprising means connected between said shaft and said wire feed mechanism whereby a differential in linear speed is set up between said knives and said wire after said knives are actuated.

15. Mechanism according to claim 14 wherein said wire feed mechanism retracts the wire after said knives have been actuated.

16. Mechanism according to claim 15, and further comprising wire gripping means carried by said shaft and moveable relative thereto and a linkage between said shaft and said gripping means adapted to actuate said gripping means to pull the section of wire severed by said knives away from said knives after said knives have been actuated and at a linear speed in excess of the linear speed of said knives.

17. A wire cutting and stripping mechanism comprising a power source, a first shaft, a sleeve coaxially mounted over said first shaft and freely rotatable thereover, said sleeve being connected to and rotated by said power source, a gear train between said sleeve and said first shaft, a trunnion gear differentially connected in said gear train, said trunnion gear being connected to and oscillated by said power source whereby said first shaft is stopped during a portion of its rotational cycle, a second shaft, a second sleece mounted coaxially and freely rotatable around said second shaft, said second sleeve being rotated by said power source, a second gear train between said second sleeve and said second shaft, a second trunnion gear differentially connected in said second gear train, said trunnion gear being connected to and oscillated by said power source to alter the rotation of said second shaft during a portion of its rotational cycle, a third shaft, a gear train connected between said second shaft and said third shaft operative to rotate said third shaft at a selected ratio between said second and third shafts, a wire feed reel connected to and rotated by said third shaft, cutting and stripping knives connected to said first shaft and rotated around said shaft, a linkage between said first sleeve and said cutting knives operative to actuate said cutting knives when said first shaft is substantially motionless, said wire feed reel being arranged to stop when said first shaft stops and immediately thereafter to reverse in rotation for a predetermined distance, a pair of gripper jaws pivotally connected on said first shaft, a linkage between said gripper jaws and said first sleeve operative to actuate said gripper jaws after said cutting knives have been actuated, a pair of scrap ejecting blades interposed between the sets of cutting and stripping knives, and connected to said first shaft, a linkage between said scrap ejection knives and said first sleeve whereby said scrap ejection knives are actuated after the cutting and stripping knives have been actuated, a retainer finger pivotally connected to said first shaft and a linkage beween said finger and said first sleeve whereby said finger is actuated to urge the wire to be cut and stripped into a position between the opposing faces of said cutting knives within which the wire is fed before a cutting action by said knives takes place.

18. A wire cutting and stripping mechanism comprising a power source, a first shaft, a sleeve coaxially mounted over said first shaft and freely rotatable thereover, said sleeve being connected to and rotated by said power source, a gear train between said sleeve and said first shaft, a trunnion gear differentially connected in said gear train, said trunnion gear being connected to and oscillated by said power source whereby said first shaft is stopped during a portion of its rotational cycle, a second shaft, a second sleeve mounted coaxially and freely rotatable around said second shaft, said second sleeve being rotated by said power source, a second gear train between said second sleeve and said second shaft, a second trunnion gear differentially connected in said second gear train, said trunnion gear being connected to and oscillated by said power source to alter the rotation of said second shaft during a portion of its rotational cycle, a third shaft, a gear train connected between said second shaft and said third shaft operative to rotate said third shaft at a selected ratio between said second and third shafts, a wire feed reel connected to and rotated by said third shaft, cutting and stripping knives connected to said first shaft and rotated around said shaft, a linkage between said first sleeve and said cutting knives operative to actuate said cutting knives when said first shaft is substantially motionless, said wire feed reel being arranged to stop when said first shaft stops and immediately thereafter to reverse in rotation for a predetermined distance, a pair of gripper jaws pivotally connected on said first shaft, and a linkage between said gripper jaws and said first sleeve operative to actuate said gripper jaws after said cutting knives have been actuated.

19. A wire cutting and stripping mechanism comprising a power source, a first shaft, a sleeve coaxially mounted over said first shaft and freely rotatable at a uniform speed thereover, said sleeve being connected to and rotated by said power source, a gear train between said sleeve and said first shaft, a trunnion gear differentially connected in said gear train, said trunnion gear being connected to and oscillated by said power source whereby said first shaft is stopped during a portion of its rotational cycle, a second shaft, a second sleeve mounted coaxially and freely rotatable at a uniform speed around said second shaft, said second sleeve being rotated by said power source, a second gear train between said second sleeve and said second shaft, a second trunnion gear differentially connected in said second gear train, said trunnion gear being connected to and oscillated by said power source to alter the rotation of said second shaft during a portion of its rotational cycle, a third shaft, a gear train connected between said second shaft and said third shaft operative to rotate said third shaft at a selected ratio between said second and third shafts, a wire feed reel connected to and rotated by said third shaft, cutting and stripping knives connected to said first shaft and rotated around said shaft, a linkage between said first sleeve and said cutting knives operative to actuate said cutting knives when said first shaft is substantially motionless, said wire feed reel being arranged to stop when said first shaft stops and immediately thereafter to reverse in rotation for a predetermined distance, a pair of gripper jaws pivotally connected on said first shaft, and a linkage between said gripper jaws and said first sleeve operative to actuate said gripper jaws after said cutting knives have been actuated.

20. A wire cutting and stripping mechanism comprising a power source, a rotatable shaft driven by said source, a differential mechanism connected between said source and said shaft for intermittently rendering said shaft substantially motionless, knife members connected to said shaft, a sleeve mounted coaxially and rotating independently around said shaft, said sleeve being opertively connected to said power source, means connected between said sleeve and said knives to actuate said knives while said shaft is substantially motionless, a second shaft, a wire feed mechanism connected to and operated by said second shaft, said wire feed mechanism arranged to pass wire toward and between said knife members, said second shaft being connected to and operated by said power source, a differential mechanism between said power source and said second shaft, whereby said second shaft is rendered intermittently motionless and immediately subsequent thereto to reverse in its rotation for a short period of time, said second shaft becoming motionless substantially at the same time that said first shaft becomes substantially motionless.

21. A wire cutting and stripping mechanism comprising a power source, a first shaft connected to and rotated by said power source, wire cutting and stripping means connected to and rotated around said first shaft, a sleeve coaxially rotatable over said first shaft, said sleeve being operatively rotated by said power source, a linkage between said sleeve and said cutting and stripping means operated by the rotation of said sleeve to intermittently operate said cutting and stripping means, a second shaft, wire feed means connected to and rotated by said second shaft, a gear train connected between said first shaft and said second shaft whereby said second shaft is rotated by the rotation of said first shaft, a gear ratio on said gear train being selected whereby there is obtained a differential in linear speed between the wire fed by said wire feed means on said second shaft and the linear speed of said cutting and stripping means.

22. Mechanism according to claim 21, and further comprising a trunnion on said first shaft, a bevel gear pinned to and rotating with said first shaft, a second bevel gear connected to and rotating with said sleeve, said sleeve and said second bevel gear being rotated at a uniform speed by said power source, a trunnion gear rotating around said trunnion and operatively connecting said two bevel gears, a link on said trunnion, a crank arm connected between said link and said power source, said link and crank arm being adapted to produce an oscillating motion upon said trunnion whereby said first shaft is rotated at a non-uniform speed.

23. A mechanism according to claim 22, and further comprising a pair of gripper jaws connected to and rotated around said first shaft, a linkage between said sleeve and said gripper jaws operative to cause said jaws to grasp the section of wire that has been cut and to advance said wire at a linear speed greater than the linear speed of the wire cutting and stripping means.

24. A mechanism comprising a first shaft arranged to be rotated at substantially constant speed, a second shaft, means connecting said first shaft and said second shaft and rotating said second shaft with a periodic motion whereby said second shaft is caused to remain substantially motionless during a predetermined portion of each revolution of said first shaft, said means comprising a first gear driven by the first shaft, a second gear connected to said second shaft, a trunnion freely and rotatably mounted on said second shaft, a third gear freely rotatably mounted on said trunnion and meshing with both said first and said second gears, and reciprocating means connected between said first shaft and said trunnion to impart an oscillatory motion to said trunnion.

25. Mechanism acocrding to claim 24, in which said reciprocating means comprises a crank connected to said first shaft and a connecting rod connected between said crank and said trunnion.

26. A mechanism comprising a first shaft arranged to rotate at substantially constant speed, a second shaft, a first bevel gear freely rotatably mounted on said second shaft, driving means connecting said first shaft and said first gear, a second gear fixedly mounted on said second shaft, a trunnion disposed intermediate said first and second gears, a third gear rotatably mounted on said trunnion and arranged to mesh with said first and second gears, a crank on said first shaft, a connecting rod between said crank and said trunnion and arranged to impart an oscillatory motion to said trunnion whereby said second shaft is caused to remain substantially motionless during a predetermined portion of each revolution of said first shaft.

27. A mechanism according to claim 26, in which the driving means for driving said first gear from said first shaft comprises a sprocket secured to the first shaft, a second sprocket connected to said first gear and rotating therewith freely around said second shaft, and a chain interconnecting said two sprockets.

28. A mechanism comprising a first shaft arranged to be rotated at substantially a constant speed, a second shaft, means connecting said first shaft and said second shaft and rotating said second shaft with a periodic motion whereby said second shaft is caused to remain substantially motionless during a predetermined portion of each revolution of said first shaft, a third shaft, second means connecting said first shaft and said third shaft and rotating said third shaft with a periodic motion whereby said third shaft is caused to alter the speed of its rotation during a predetermined portion of each revolution of said first shaft, said first and second means each comprising a first gear freely rotatable on said second and third shafts respectively and driven by said first shaft, a second gear connected to said second and third shafts respectively and arranged to drive said second and third shafts, a trunnion freely and rotatably mounted on said second and third shafts respectively, a third gear freely rotatably mounted on each of said trunnions and meshing with the respective first and second gears on each of said second and third shafts, and reciprocating means connected between said first shaft and each of said trunnions to impart an oscillatory motion to said trunnions.

29. Mechanism according to claim 28 in which said reciprocating means comprise a crank connected to said first shaft and connecting rods between said crank and each of said trunnions.

30. A mechanism comprising a first shaft arranged to rotate at substantially constant speed, a second shaft, a third shaft, a trunnion and gear mechanism on each of said second and third shafts, each of said trunnions being connected to said first shaft, the gear portion of each of said trunnion and gear mechanisms being driven by said first shaft, and connecting rods between said first shaft and each of said trunnions and arranged to impart an oscillatory motion to said trunnions whereby said second shaft is caused to remain substantially motionless during a predetermined portion of each revolution of said first shaft, and whereby the speed of rotation of the third shaft is caused to alter during a predetermined portion of each revolution of said first shaft.

31. Mechanism according to claim 30 in which the dimensions of the gears and trunnion on the third shaft and the connecting rod attached to said trunnion are arranged to cause said third shaft to reverse its rotational direction during a predetermined portion of each revolution of said first shaft.

32. A device according to claim 11, and further comprising a projection on each stripping knife, said projection being arranged to abut the outer periphery of the insulation of the wire whereby the cutting edges of the stripping knives are prevented from cutting into the conductor of the wire.

33. A mechanism comprising a first shaft arranged to rotate at a constant speed, a sprocket fixed to and rotated by said first shaft, a crank mounted on and rotated by said first shaft, a second shaft, a second sprocket attached to a bevel gear, said second sprocket and said gear being free to rotate around said second shaft, an endless sprocket chain interconnecting said sprockets on said first and second shafts, a second bevel gear fixed to said second shaft and spaced from said first bevel gear, a trunnion freely mounted on said second shaft between said first and second bevel gears, a third bevel gear freely mounted on said trunnion and meshing with said first and second bevel gears, and a connecting rod interconnecting said crank on said first shaft and said trunnion on said second shaft to impart oscillatory motion to said trunnion from said crank, the dimensions of said crank arm and said trunnion being such as to cause said second shaft to reverse its rotational direction during a predetermined portion of each rotation of said second shaft.

References Cited in the file of this patent
UNITED STATES PATENTS

| | | |
|---|---|---|
| 1,626,119 | Olin et al. | Apr. 26, 1927 |
| 1,753,561 | Emmert | Apr. 8, 1930 |
| 1,787,658 | Andren et al. | Jan. 6, 1931 |
| 1,801,278 | Knuuti | Apr. 21, 1931 |
| 1,831,115 | Holmes | Nov. 10, 1931 |
| 2,395,374 | Lembitz et al. | Feb. 19, 1946 |
| 2,465,537 | Isaacson et al. | Mar. 29, 1949 |
| 2,497,112 | Andren | Feb. 14, 1950 |